United States Patent [19]

Perkey et al.

[11] 4,276,006
[45] Jun. 30, 1981

[54] SYSTEM FOR COOLING MOTOR BEARINGS

[75] Inventors: Russell C. Perkey; David C. Thoman, both of Mishawaka; James M. Eastman, South Bend, all of Ind.

[73] Assignee: The Bendix Corporation, Southfield, Mich.

[21] Appl. No.: 958,590

[22] Filed: Nov. 7, 1978

[51] Int. Cl.³ .................................................. F01C 21/06
[52] U.S. Cl. .......................................... 418/94; 308/77
[58] Field of Search ............. 308/77; 60/657, DIG. 5; 418/94, 98; 123/41.64

[56] References Cited

U.S. PATENT DOCUMENTS

| | | | |
|---|---|---|---|
| 1,041,606 | 10/1912 | Dembowsky | 418/94 |
| 1,800,927 | 4/1931 | Britain | 123/41.64 |
| 2,439,127 | 4/1948 | Dailey et al. | 308/77 |
| 2,789,021 | 4/1957 | Pederson | 308/77 |
| 2,799,253 | 7/1957 | Lindhagen | 418/94 |

*Primary Examiner*—S. Clement Swisher

*Attorney, Agent, or Firm*—Leo H. McCormick, Jr.; Ken C. Decker

[57] ABSTRACT

A system for cooling the bearings supporting the shaft of a rotor in a pneumatic motor powered with hot pressurized fluid. The rotor responds to the flow of hot fluid under pressure by moving to develop output power. The rotors which conduct heat from the hot fluid through the shaft and into the bearings have a series of peripheral axial slots adjacent the ends of the shaft. Fasteners engage the shaft to position the bearings over the series of axial slots. A manifold connects the slots to a discharge conduit. Some of the hot pressurized fluid is diverted through a nozzle in the discharge conduit to create a pressure differential between the manifold and the surrounding environment. This pressure differential draws air from the surrounding environment through the slots and into the manifold. The air on flowing through the slots absorbs heat from the shaft and the inside of the bearings to thereafter maintain the temperature of the bearing below the hot fluid.

9 Claims, 4 Drawing Figures

– 4,276,006 –

SYSTEM FOR COOLING MOTOR BEARINGS

BACKGROUND OF THE INVENTION

In jet engine powered aircraft it is common practice to use hot compressor discharge air as the motive force for air motors which are used to operate various controls. It is not uncommon for the temperature of the compressor discharge air on entering an air motor to exceed 1100° F. Unfortunately, the rotors and housing of the air motor conduct heat from the compressor discharge air into the bearings which support the rotors. Even though the bearings are heat treated, after a period of time, the heat which is transmitted through the shaft and housing can cause excessive wear of the races. Thereafter, the pressure required to operate the rotors increases and at some point in time the rotors can freeze and thereby render the controls which are operated thereby inoperative.

SUMMARY OF THE INVENTION

It has been determined that the expected life of the bearings used in hot fluid driven air motors could exceed 4,000 hours of continuous operation if the temperature of the bearings is maintained below 500° F.

We have devised a cooling system for an air motor wherein the bearings are maintained at a temperature below 500° F. even though the operating temperature of the compressor discharge air is approximately 1000° F.

The cooling system has a manifold connected to a discharge conduit through which air from the surrounding environment is drawn through and around the bearings by a pressure differential. The pressure differential is created between the manifold and discharge conduit by the flow of compressor discharge air through a nozzle in the discharge conduit. As long as compressor discharge air flows through the nozzle, air from the surrounding environment flows through and around the bearing to maintain the temperature thereof below the temperature of the compressor discharge air.

It is therefore an object of this invention to provide an air cooling system for the bearings that support a rotor in a motor.

It is another object of this invention to provide a motor with an aspirator system that draws air from the surrounding environment to cool the bearings supporting a shaft of a rotor.

It is a further object of this invention to provide a cooling system for a motor that removes heat from a drive shaft to protect the support bearings associated therewith from damage.

These and other objects should be apparent from reading this specification and viewing the drawing.

DETAILED DESCRIPTION OF THE INVENTION

Figure 1:
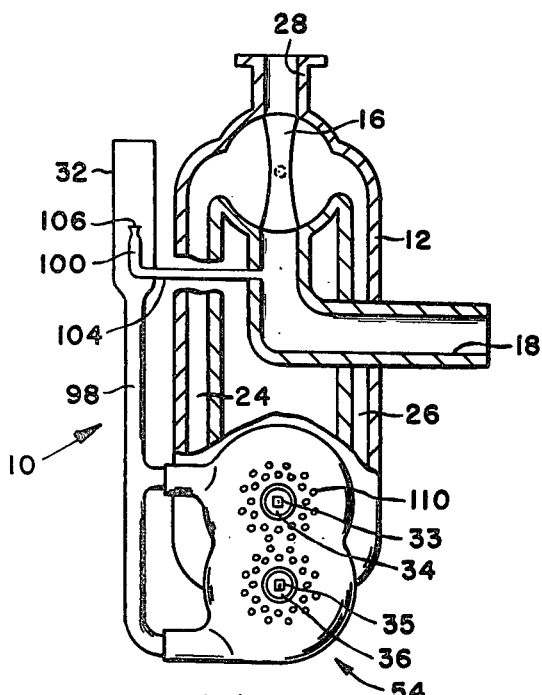
FIG. 1 is a schematic illustration of a bearing cooling system for a motor made according to the principles of this invention.
Figure 2:
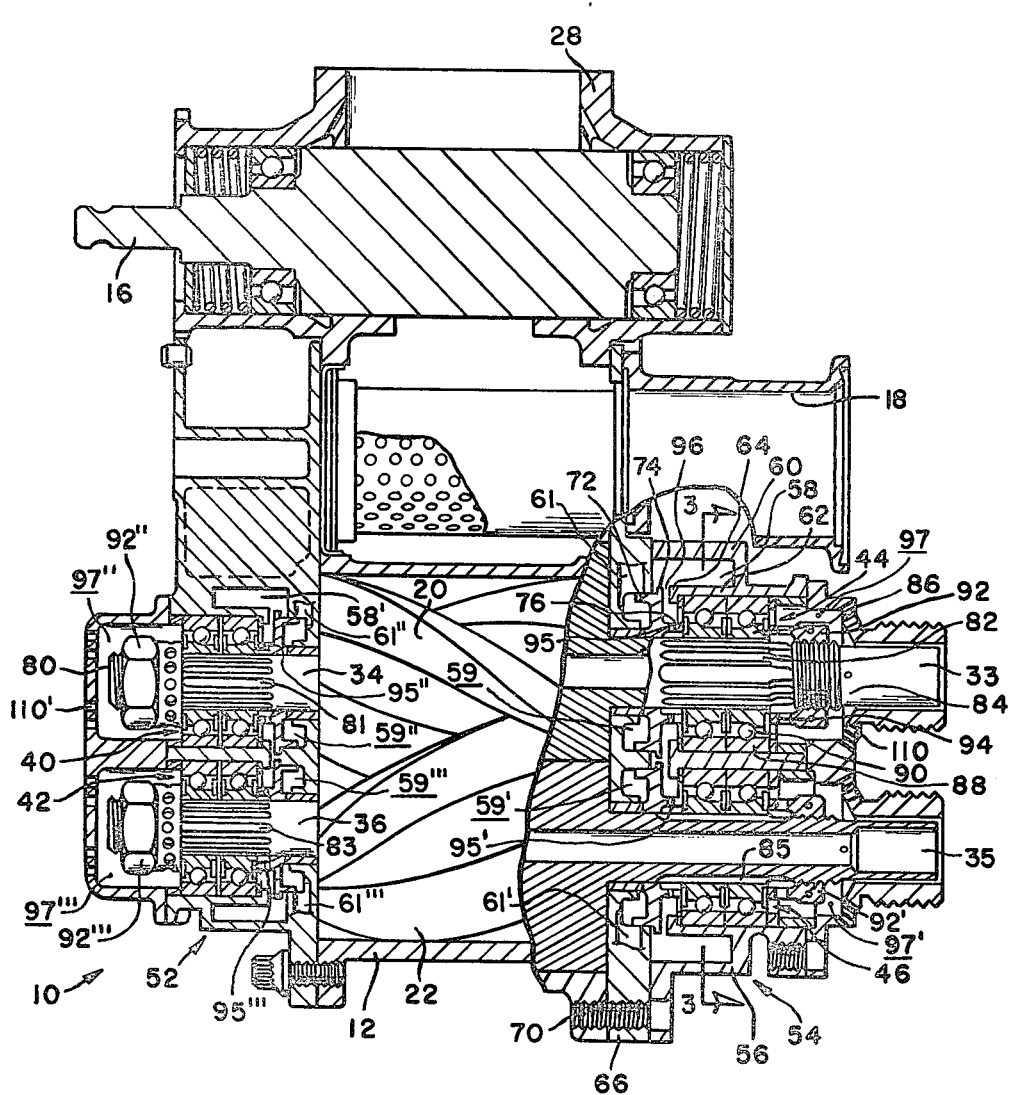
FIG. 2 is a sectional view of the motor in FIG. 1.

A motor 10, shown in FIG. 1, has a housing 12 with a motor control valve 16 located therein for selectively communicating a source of fluid under pressure, i.e., the hot air discharged from a compressor, from an inlet passage 18 to rotor elements 20 and 22 shown in FIG. 2 through either passage 24 or passage 26 while allowing fluid from the rotor elements 20 and 22 to be exhausted through a discharge conduit 28.

The rotor elements 20 and 22 respond to a flow of fluid from control valve 16 by rotating shafts 34 and 36 on support bearings 40, 42, 44 and 46 shown in FIG. 2 to provide a dual output operational signal which is transmitted to the motor controls through linkage attached to the square section holes 33 and 35 in shafts 34 and 36. When the fluid engages the rotor elements 20 and 22, heat is conducted through the rotor elements 20 and 22 and shafts 34 and 36 into the support bearings 40, 42, 44 and 46. However, most of this heat is intercepted and carried away from shafts 34 and 36 by a cooling system made according to this invention before any damage can occur to support bearings 40, 42, 44 and 46.

The cooling system includes first and second manifolds 52 and 54 into which air from the surrounding environment is drawn through the bearings 40, 42, 44 and 46 to maintain the temperature thereof below the temperature of the fluid which passes through the rotor elements 20 and 22.

The first and second manifolds 52 and 54 are essentially identical and since each bearing is cooled in the same manner, only the specific components of bearing 44 and its relationship with manifold 54 will be described in detail, however, similar components may be identified with a ' when needed to clarify the operation of the invention.

Figure 3:
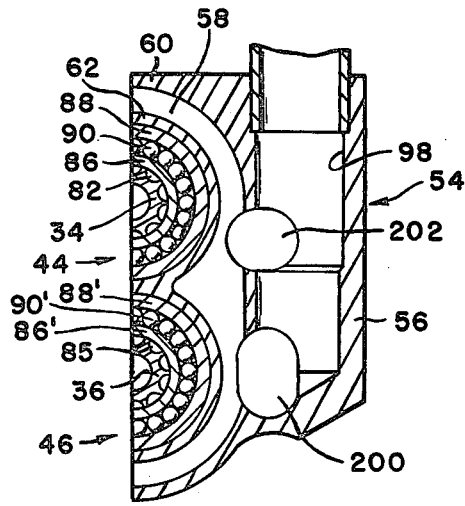
FIG. 3 is a sectional view taken along lines 3—3 of FIG. 2.

Manifold 54 as shown in FIGS. 1, 2 and 3 has a housing 56 with an annular passage 58 located between walls 60 and 62. Wall 62, as best shown in FIGS. 2 and 3, is shaped like an hourglass. A lip 64 projects inwardly from wall 62. Wall 60 which engages end plate 66 of the rotor housing 12 is connected thereto by a series of bolts 70 to establish a passage 96 between lip 64 and sleeve 72 which is tightly fitted on shaft 34. Sleeve 72 which has a flange 74 and an annular projection 76 that engages the inner race 86 of bearing 44 rotates in the end plate 66. The annular projection 76 has a series of holes 95, 95', 95", 95''' therethrough for connecting passage 96, 96' with slots 80, 81, 83, 85.

Shaft 34 has a first series of axial slots 81 located on its peripheral surface adjacent end 80 and a second series of axial slots 82 located adjacent end 84.

Bearing 44 has an inner race 86 and an outer race 88 in which bearing balls 90 are retained. A fastener 92 has threads thereon which are matched with threads on shaft 34. When the fastener 92 is tightened on shaft 34, face 94 engages the inner race 86 to bring its inner face into engagement with annular projection 76 and align the inner race 86 over slots 82. At the same time, radial holes 97 in the fastener 92 and holes 95,95' in the annular projection 76 are aligned with slots 82 to establish an unrestricted flow path from atmospheric chamber 97 to annular passage 58.

Similarly bearings 40, 42 and 46 are aligned by fasteners 92', 92" and 92''' to provide flow paths between chambers 97', 97" and 97''' and annular passages 58 and 58', respectively.

Annular passage 58 as shown in FIGS. 1 and 3, is connected to a discharge conduit 32 by an exhaust conduit 98. Cross-over pipes or passages 200 and 202 connect annular passage 58' of the manifold 52 to the exhaust conduit 98. A bleed conduit 104 is connected to inlet conduit 18 to provide a continuous flow of fluid from the source into the discharge conduit 32. An ejector nozzle 100 is attached to the end of bleed conduit 104 to control the flow of fluid from the source into the discharge conduit 32.

MODE OF OPERATION OF THE INVENTION

When fluid under pressure is available in the supply conduit 18 and control valve 16 is in the position shown in FIG. 1, the rotor elements 20 and 22 are stationary. However, fluid from the source continuously flows in bleed conduit 104 and through nozzle 100 into the discharge conduit 32. The end 106 of nozzle 100 is downstream from the connection of the exhaust conduit 98 coming from manifolds 52 and 54. As fluid discharges from the end 106 nozzle 100, a vacuum or pressure differential is created between the discharge conduit 32 and the surrounding environment. This pressure differential causes air from the surrounding environment to flow through holes 112 in the manifolds 52 and 54, over shafts 34 and 36 into chambers 97, 97', 97'' and 97'''. From chambers 97, 97', 97'' and 97''' air flows through radial passages 94, 94', 94'' and 94''', axial slots 81, 82, 83 and 85, radial passages 96, and 96' and into annular passage 58 and 58' before entering the exhaust conduit 98. As this air flows through slots 81, 82, 83 and 85 located under the inner races of bearing 40, 42, 44 and 46, heat in shafts 34 and 36 is absorbed and carried along with the air to the discharge conduit 32.

Hot fluid also leaks from rotor chamber 21 along shafts 34 and 36 into annular chambers 58 and 59 and 58' and 59'. Chambers 59 and 59' are connected to the surrounding environment through a series of openings 61, 61' and 61'', 61''', respectively. The hot fluid that leaks into chambers 59 and 59' is under pressure and the flanges 74, 74' engage the housing 66 to assure that this fluid is directed to the surrounding environment. Unfortunately some small portion of the hot fluid bypass flow from chamber 21 does enter chamber 58, 58' because of the seal limitations between flange 74 and housing 66 and the interior of the sleeves 72, 72' etc. and shafts 34 and 36. Any leakage of the hot fluid into chambers 58, 58' must be taken into consideration in establishing the size of nozzle 100 in order that the flow of ambient air or air from the surrounding environment across the bearing 40, 42, 44, and 46 is not adversely affected.

When an operational input signal is transmitted to control valve 16 requesting an output from shafts 34 and 36, control valve 16 is correspondingly moved to allow the fluid under pressure in supply conduit 18 to flow to passage 24 or 26 corresponding to a required directional output. Assume control valve 16 is rotated to allow fluid to flow in passage 24 to rotor elements 20 and 22. The pressure of the fluid causes the rotor elements 20 and 22 to move and rotate output shafts 34 and 36 corresponding to the input signal supplied to control valve 16. The fluid after passing through rotor elements 20 and 22 flows in conduit 26 past the control valve 16 and is exhausted into the atmosphere through discharge conduit 28. As the fluid passes through rotor elements 20 and 22, heat therein is conducted through the rotors and into shafts 34 and 36. However, the air flow through the slots in the shafts 34 and 36 under the bearings 40, 42, 44 and 46 absorbs this heat before any damage occurs in these bearings.

When the output positions of shafts 34 and 36 matches the desired positions, control valve 16 is moved to the neutral position to again interrupt the flow of fluid from the supply passage 18 to rotor elements 20 and 22. However, some hot fluid continues to flow through control valve 16 and passages 24 and 26 even when the rotors 20 and 22 are stationary since it is often necessary for the shafts 34 and 36 to maintain a holding torque. In addition, because of the temperature of the operational fluid, close tolerances are not usually provided between the components in the motor 10 to allow for temperature expansions and contractions. Since the flow of fluid through conduit 104 is continuous even under these conditions, air flows through the slots under bearings 40, 42, 44 and 46 to absorb heat from the rotors 34 and 36 before the bearings are effected by an increase in temperature caused by heat conducted thereto.

Figure 4:
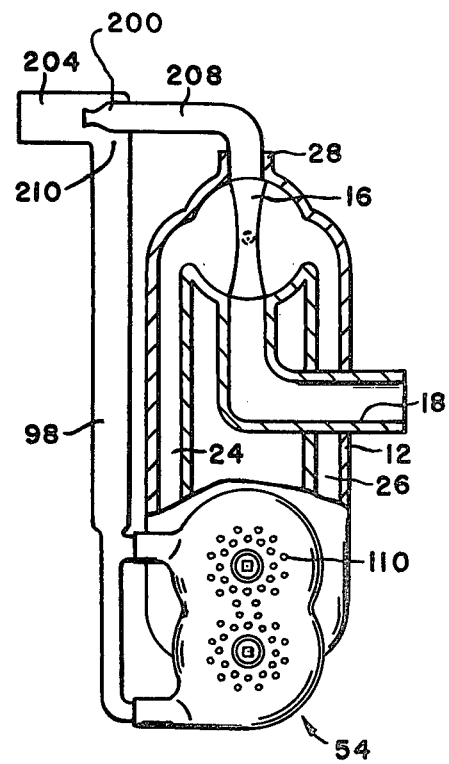
FIG. 4 is a schematic illustration of another cooling system made according to this invention.

For some application it may be desirable to create the pressure differential between the manifolds 52 and 54 and the surrounding environment by a cooling system such as shown in FIG. 4. In this system, the bearings 40, 42, 44 and 46 and their relationships with the slots 81, 82, 83 and 85 are identical, however, the development of the pressure differential occurs in a different manner.

The exhaust duct 208 from motor control valve 16 is connected to a nozzle 200. Leakage through motor control valve 16 and the rotor elements 20 and 22, creates a vacuum adjacent the end 210 of nozzle 200 as it flows into discharge conduit 204. This vacuum or lower pressure causes air from the surrounding environment to be aspirated through the slots 81, 82, 83 and 85 in rotors 20 and 22 in the same manner as in the motor of FIG. 1 to absorb heat from the shafts 34 and 36 and thereby prevent the bearing from being damaged by heat. It should be noted that nozzle 200 throttles the motor exhaust and thus some power is lost from the output of shafts 34 and 36. However, for some application the minimal loss in power is acceptable.

In order to evaluate the cooling effect of aspirating air from the surrounding environment through the bearing 40, 42, 44 and 46, the following tests were conducted on a motor 10.

Thermocouples were positioned adjacent the bearings 40, 42, 44 and 46 to provide a continuous temperature reading with the rotors 20 and 22 held in a fixed position.

The temperature of the operational fluid in conduit 18 was about 1000° F. and at 340 psi while the air temperature surrounding the motor 10 was about 120° F.

Bearings 44 and 46 were cooled by air while a cover was placed over manifold 52 to prevent air flow from cooling bearings 40 and 42 during this test. An air ejector similar to that shown in FIG. 4 using throttled motor supply air was used to aspirate the calculated air flow required to cool bearings 44 and 46. Bearing cooling air flow was selected by setting the pressure drop through calibrated holes 110.

Thereafter, control valve 16 was opened enough to develop a typical operational holding torque on shafts 34 and 36. The fluid passing through the rotor elements 20 and 22 caused the temperature thereof to increase and heat conducted through the rotors 34 and 36 into bearings 40, 42, 44 and 46. The temperature of bearings 40 and 42 reached about 930° F. which is too hot for adequate bearing life. The maximum temperature that bearings 44 and 46 experienced was about 430° F. which is below the desired temperature of 500° F. and within the temperature range which would permit the use of high temperature grease packed bearings to further increase the life of the bearings.

We claim:

1. In a pneumatic motor having rotor means supported by bearing means in a housing, said rotor means being moved by a supply of hot fluid under pressure to develop an output force, said rotor means and housing conducting heat from the hot fluid into said bearing means, the improvement comprising:

means for cooling said bearing means to a temperature below said hot fluid to prevent damage to said bearing means by the heat conducted through the rotor means and housing, said means for cooling including:

seal means for attenuating the effect of hot fluid leakage from the housing along the shafts of said rotor means, said seal means including a sleeve on each end of said shafts between said bearings and housing, each of said sleeves having a projection that engages one of said bearings and a flange that engages said housing, each of said sleeve and flange being positioned on said rotors to define an annular space between the bearings and the housing, said annular space being connected to the surrounding environment, said leakage of hot fluid along said shafts flowing from the annular space into the surrounding environment to prevent said hot fluid from reaching said bearing means; and means for producing a vacuum, said vacuum being connected to said bearings for drawing air from the surrounding environment across the bearings to maintain the temperature of the bearings below that of the hot fluid.

2. In the motor, as recited in claim 1 wherein said means for producing a vacuum includes:

a nozzle connected to said supply of hot fluid;

a discharge conduit through which said nozzle exhausts to the atmosphere; and manifold means located between said bearing means and said discharge conduit, said hot fluid under pressure on passing through said nozzle creating a pressure differential between said manifold means and the surrounding environment, said pressure differential thereafter drawing air from the surrounding environment through said bearing means to remove heat conducted thereto through said rotor means and housing.

3. In the motor, as recited in claim 2, wherein said rotor means includes:

a shaft having ends supported by said bearing means, said shaft having a series of peripheral axial slots adjacent said ends, said air from the environment flowing through said series of slots and absorbing heat from said shaft.

4. In the motor, as recited in claim 3, wherein said rotor means further includes:

fastener means for engaging said ends of said shaft to hold said rotor means in a fixed axial relationship with said bearing means, said fastener means having a series of radial passages through which air is directed to said series of peripheral axial slots.

5. In the motor, as recited in claim 4, wherein the supply of hot fluid flows continuously through said nozzle to provide a substantially continuous flow of air through said bearing means.

6. In the motor, as recited in claim 4 further including:

an exhaust conduit connected to said rotor means for communicating the hot fluid exhausted from the rotor means into said discharge conduit, said nozzle being connected to said exhaust conduit to develop said pressure differential.

7. In the motor, as recited in claim 5 wherein said bearing means includes:

a first member and a second member located on opposite ends of said shaft, each of said first and second members having an inner race, and an outer race for retaining a plurality of bearing balls, said inner race being fixed to said shaft and said outer race engaging said housing, said air flow through said slots in said shaft directly engaging said inner race and removing heat therefrom.

8. In the motor as recited in claim 2 further including:

a control valve for controlling the communication of the hot fluid under pressure to and away from said rotor means to control the direction and force developed by said rotor means.

9. In the motor as recited in claim 8 wherein said hot fluid flows from said rotor means through said nozzle to develop said pressure differential between said manifold and the surrounding environment.

* * * * *